Patented Dec. 26, 1939

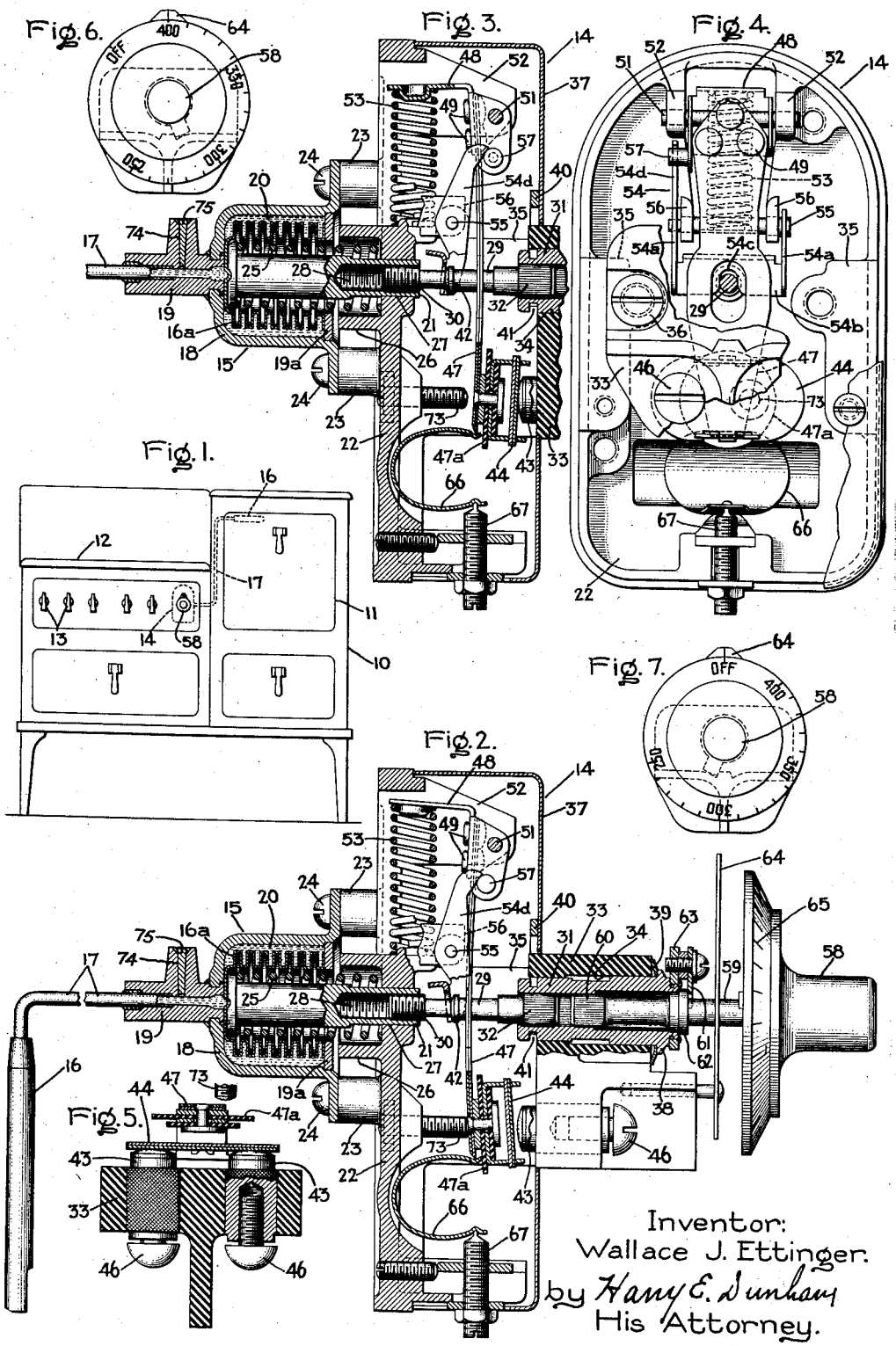

2,184,339

UNITED STATES PATENT OFFICE 2,184,339

TEMPERATURE CONTROL DEVICE

Wallace J. Ettinger, Chicago, Ill., assignor to Edison General Electric Appliance Company, Inc., Chicago, Ill., a corporation of New York Application November 12, 1937, Serial No. 174,176

3 Claims. (Cl. 200—140)

This invention relates to temperature control devices and it has for its object the provision of an improved device of this character.

Although not limited thereto, this invention relates more specifically to means for automatically opening and closing an electric circuit in response to temperature changes, such as the heating circuit, or a controlling circuit for the heating circuit, of an electric oven, in order to maintain a substantially constant predetermined temperature. It is to be understood, however, that this invention is not limited in its application to the control of switches, but may be used in connection with other controlling devices, such as a fuel control valve.

More specifically, this invention contemplates the provision of an improved temperature control device of the bulb and bellows type such as described and claimed in the patent to N. Miller and R. A. Winborne, No. 2,110,674, dated March 8, 1938, and assigned to the same assignee as this invention, and it involves improved means for effecting an "off" position for the switch when heat is cut off from the controlled heating device.

For a more complete understanding of this invention, reference should be had to the accompanying drawing, in which Fig. 1 is an elevation of an electric range provided with temperature control means arranged in accordance with this invention to control the temperature of the oven provided for the range; Fig. 2 is a fragmentary vertical sectional view of a temperature control device arranged in accordance with this invention and used in the range of Fig. 1; Fig. 3 is a fragmentary view mainly in section and similar to Fig. 2, but illustrating certain parts of the mechanism in different operative positions than they occupy in Fig. 2; Fig. 4 is an end view in elevation of the temperature control device of Figs. 2 and 3, portions being removed so as to illustrate certain details of construction; Fig. 5 is a fragmentary sectional view taken on an enlarged scale illustrating a controlling switch used in the temperature control device of Figs. 2, 3, and 4; and Figs. 6 and 7 are elevations of a temperature setting and indicating member used in the control device.

Referring to the drawing, this invention has been illustrated in connection with an electric range, but it is to be understood that the control device has general application, and may be used to control various other heated or cooled devices, such as frying kettles, griddles, refrigerators, and various other electric heated or cooled devices wherein it is desirable to hold a substantially constant preselected temperature. In addition, it is to be understood that this invention is not limited in its application to electrically heated devices, but may be used to control the flow of fuel to gas burners, and the like.

As shown in Fig. 1, the electric range 10 comprises an oven 11, and an area 12 for supporting a plurality of surface heating units (not shown) that are controlled by means of switches 13, while the heating elements (not shown) for the oven are controlled by means of a suitable temperature control device 14 arranged in accordance with this invention.

The temperature control device is of the bulb and bellows type. As shown, a bellows assembly 15 is connected into a closed system with a bulb 16 located in the oven 11 by means of an elongated flexible tube 17. The bellows assembly 15 comprises a metallic expansible and contractable bellows 16a, mounted within a cup-shaped chamber 18. At the closed end of the chamber, there is provided a nipple 19 sealed into the wall of the chamber and having a liquid-tight seal with the tube 17. At the opposite end of the chamber 18, that is, at the mouth of the chamber, there is provided an annular plate 19a having its outer edge sealed to the chamber. The bellows 16a, as shown, is closed at its end adjacent the closed end of the chamber 18, while its opposite end is provided with an open mouth. The walls about the mouth are secured to the annular plate 19a with a liquid-tight seal in any suitable manner, as by soldering.

A suitable thermal liquid 20, having a relatively high coefficient of expansion and the property of retaining its liquidity throughout normal working temperatures in the oven, completely fills the space within the chamber 18 between the walls of the chamber and the bellows 16a, and also completely fills the bulb 16, and the tube 17 connecting the bulb with the bellows motor into a closed fluid system. It will be understood that expansion and contraction of the fluid in the closed system responsively to the temperature of the bulb 16 in the oven will control the movement of the bellows; this movement in turn is utilized to operate the switch.

A stud 21 is arranged within the bellows 16a with its axis substantially coinciding with the axis of the bellows and having its inner end resting against the closed end of the bellows in a suitable depression provided for it in the bellows, as shown in Fig. 2. The stud 21 projects from the opposite end of the bellows through the annular plate 19a.

The bellows assembly, including the bellows and its chamber, the stud 21 and the spring 25 are mounted upon a suitable supporting base 22, which, as shown, is provided with upright bosses 23 on its side adjacent the bellows chamber and which function to support the bellows assembly. As shown, the housing 18 for the bellows assembly is mounted on the studs and secured thereto by means of screw fastening means 24.

Movement of the bellows inwardly in response to an increase in temperature of the oven, that is, in response to an expansion of the fluid 20 is resisted by a loading spring 25 which is of the compression type and which is arranged around the stud 21, one end of the compression spring bearing against the inner end of the stud, as shown, and the opposite end resting on the adjacent surface of the support 22. Preferably and as shown, the support will be provided with an upright cylindrical wall 26, surrounding the lower portion of the spring.

The outer end of the stud 21 is provided with two parallel flat surfaces, which will allow the stud to have a free sliding motion in the aperture 27, but prevent it from turning.

This outer end of the stud is provided with an internal threaded bore 28 in which is threaded a shaft or bar 29. As shown, the bar 29 is arranged in axial alignment with the stud 21 and on its end adjacent the stud is provided with an enlarged threaded head 30 which is received in the threaded bore 28 of the stud. The opposite end of the rod 29 is received to rotate with the bushing 31 and to slide longitudinally relatively thereto by means of a splined connection 32. The bushing 31 is mounted in a suitable supporting member 33, which as shown is provided with an aperture 34 therethrough for receiving the bushing. The supporting member 33 in turn is mounted upon the base 22, which is provided with relatively long protuberances or shoulders 35 positioned opposite each other at the sides motor, as clearly shown in the drawing. The and on the face of the base opposite the bellows supporting block 33 is secured to these shoulders by means of screw fastening means 36 received in threaded apertures provided for them in the shoulders 35. Preferably, a suitable casing 37 will be provided on the base 22. The support 33 is formed of a suitable electrically insulating material, such as a phenol condensation product.

The bushing 31 on its outer end is provided with a shoulder 38 beneath which is positioned a spring washer 39. The inner end of the bushing is secured against outward displacement by the spring washer by means of a U-shaped locking member 40, the two legs of which are received in a recess 41 provided for them in the inner end of the bushing.

Mounted upon the shaft 29 adjacent its enlarged inner end 30 is an abutment or shoulder 42. This abutment is used to control an electric switch comprising a pair of fixed contacts 43 with which a movable bridging contact 44 cooperates. The fixed contacts 43 are of stud-like form and are mounted in the supporting member 33 so that their inner ends project into the casing 37. Suitable binding screws 46 on the exterior of the casing are threaded into the contact members 43.

The bridging contact 44 is carried by means of a suitable switch or controlling arm 47, and is electrically insulated from the arm by a sheet of insulating material 47a. The controlling arm 47 is mounted upon a suitable supporting member 48. The arm 47 has an elongated aperture through which the shaft 29 is directed. The supporting member 48, as shown, is of right angle form, to one arm of which the switch arm 47 is rigidly secured, as by means of rivets 49. The supporting member is mounted on a supporting shaft 51 that is supported by means of bearings 52 provided on the base 22. The shaft 51 constitutes a pivotal support for the switch arm 47. Bearing on the other arm of the support 48 is a compression spring 53. The compression spring 53 applies a force to the switch arm to move it in a clockwise direction, as viewed in Figs. 2 and 3, that is, to move it in a direction to open the switch contacts 43.

Movement of the switch arm 47 to open the switch under the influence of the spring 53 is resisted by the abutment 42 on the rod 29. For this purpose, a suitable lever 54 is interposed between the abutment and the switch arm 47. The lever 54, as shown, is pivotally supported intermediate its ends on a suitable pin or shaft 55, which in turn is mounted in bearing members 56 provided for it on the base 22. The end of the lever 54 adjacent the shaft 29 is provided with a pair of arms 54a (Fig. 4) arranged on opposite sides of the shaft and which are joined by means of a cross arm 54b in which is placed a U-shaped slot or process 54c. The shaft 29 is received in this recess and the recess is arranged so that the walls of the cross member 54b on opposite sides of the recess rest upon the abutment 42. On the opposite side of the pivot is a single arm 54d which rests upon a suitable pin or abutment 57 provided on the support 48.

It will be observed in view of the foregoing construction that the abutment 42 resists movement of the switch arm to open the switch by the spring 53, and also that the movement of the switch between its open and closed positions will be controlled by movement of the shaft 29. The movement of this shaft 29 in turn is controlled by the operation of the expansible motor 15 so that the operation of the switch is controlled by the operation of the expansible motor. It will also be observed that when the temperature of the liquid 20 in the bulb 16 increases so that it expands, the stud 21 will be moved inwardly, which operation will move the abutment 42 inwardly. This operation permits the support 48 to be moved in a clockwise direction under the influence of the spring 53 so as to move the switch arm 47 in a switch opening direction. Conversely, when the liquid in the bulb cools and contracts, the loading spring 25 of the expansible motor will move the stud 21 and shaft 29 toward the left, which operation will move the lever 54 to operate the support 48 in a counter-clockwise direction, that is, in a direction to move the switch arm 47 in a switch closing direction. In this manner, the bellows motor operates to hold a substantially constant temperature in the oven 11.

Temperature adjustment of the control device is effected by controlling the position of the abutment 42 relative to the expansible motor 15. This is accomplished by turning the shaft 29 inwardly or outwardly relative to the stud 21. In order that this can be accomplished conveniently, an adjusting knob 58 is provided. The knob 58 is secured to a shaft 59 which is mounted within the bushing 31, as clearly shown in Fig. 2. The shaft 59 has a splined connection 60 with the bushing so that when the knob 58 is rotated, the shaft 59 and also the shaft 29 will be adjusted. The shaft 59 is secured to the bushing 31 to prevent relative sliding movement between these members by means of a collar 61 bearing on a shoulder 62 provided on the shaft and which engages the bushing. The collar 61 in turn is secured to a collar 63, which is secured to the outer end of the bushing 31. In order to assist in setting the temperature of the control device, a suitable index 64 is provided to cooperate with a temperature scale 65 provided on the adjusting knob 58. The index 64 is secured to the supporting member 33. As shown, the knob may be provided with indications "O", "L", "M" and "H" indicating off, low, medium and high heats respectively. When the control knob is turned in a clockwise direction from its position of Fig. 7 toward its position of Fig. 6, it increases the temperature setting, whereas when it is returned it decreases the temperature setting.

In order to cause the switch arm 47 to move quickly with a snap action between its controlling positions, a suitable U-shaped snap action spring 66 is provided having one arm bearing on the movable end of the switch arm 47 and its other arm bearing on a fixed pivot 67 mounted opposite the movable end of the switch arm. An upper threaded stop 73 is provided for the open circuit position of the blade 47.

The relation of the U-shaped spring member 66 to the switch arm 47 is substantially the same as that described in the patent to A. H. Simmons, No. 1,743,073, dated January 7, 1930, and its action is substantially the same as described in detail in this patent.

In the operation of the control device thus far described, it will be understood that the base 22 will be located in any suitable position, such as on the switch panel of the range, and as indicated in dotted lines in Fig. 1. The bulb 16 will be located at some suitable position within the oven, the tube 17 being flexible to facilitate the positioning of the bulb 16 and the supporting plate 22. The temperature to be held by the control device will be adjusted by the knob 58 and as long as the temperature within the oven is below the temperature for which the device is adjusted, the switch arm 47 will be in its position shown in Fig. 3 to close the circuit through the switch, whereby the heating circuit for the oven will be energized. As the temperature of the oven increases, the temperature of the fluid 20 within the bulb 16 will increase and the fluid will expand. As the fluid expands, it will operate the bellows 16a to move the stud 21 toward the right, as viewed in Figs. 2 and 3. This operation, as pointed out, previously, will move the abutment 42 toward the right to permit the support 48 to move in a clockwise direction under the influence of the spring 53. Eventually, when the oven attains a predetermined maximum temperature, the fluid 20 will have expanded sufficiently to permit the spring 53 to open the switch contact 43 and thereby open the heating circuit of the oven. The heating circuit will remain open until the oven cools sufficiently to permit the fluid 20 to contract to such an extent that the loading spring 25 will have moved the abutment 42 sufficiently to return the switch to its closed position against the bias of the spring 53. In each case, the U-shaped spring 66 functions to move the control arm with a snap action. In this manner, the control device maintains a predetermined temperature which is the means between the maximum and minimum temperatures at which the switch is opened and closed.

In order to compensate for ambient temperature changes at the bellows motor 15, the switch arm 47 itself is made to function as a thermostat responsive to this ambient temperature. As shown, the switch arm 47 is formed as a bimetal bar made of two suitable strips of metal having dissimilar temperature coefficients of expansion, the two strips being securely welded together lengthwise. The strips may be formed of any suitable materials, such as nickel-chrome steels of the proper composition. The bimetal element is so arranged that when the ambient temperature increases, and thus the fluid 20 in the chamber 18 expands, the bimetal bar 47 will curve toward the right, as viewed in Fig. 3, so as to press the switch contacts together with a greater force. Thus when the ambient temperature increases, the bellows moves the abutment 42 toward the right and at the same time the thermostatic element 47 itself curves toward the right to compensate for the movement of the abutment. Conversely, when the ambient temperature decreases, the abutment 42 will move toward the left and the thermostatic element 47 also will curve somewhat toward the left to compensate for this movement of the abutment.

The liquid 20 in the bulb 16, the tube 17 and the chamber 18 is filled at an elevated temperature, which will be aproximately the minimum temperature setting of the control device. By this is meant, the liquid will be filled at the minimum temperature of the operable temperature range of the oven or other controlled heater. For example in the case of an electric oven operating between 250° F. and 550° F., the liquid will be filled at the low temperature limit of 250° F. and the liquid is filled at this temperature with the closed end of the bellows 16a against the closed end wall of the chamber 18, as shown in Fig. 2. It will be understood that when the liquid has been loaded at this elevated temperature the entire bulb and the bellows will be tightly closed. The liquid may be conveniently filled at this elevated temperature by first evacuating the bulb 16, tube 17 and chamber 20 of air, and then filling the system through an opening 74. The bellows is then forced to the closed end of chamber 18 and held there and the bulb heated to the desired elevator temperature, such as the above temperature of 250° F. As the bulb is being heated up to this temperature, the excess liquid in the system expands and escapes through the opening 74. When the bulb has been heated to 250° F. the opening is closed by sealing material 75.

It will be observed that when the liquid 20 is loaded in the bulb and bellows motor at this elevated temperature that when it subsequently cools to room temperature the bellows can expand to no greater length by reason of the contraction of the liquid in cooling because it already is bearing against the closed end of the chamber 18 which acts as a mechanical stop. That is, the bellows cannot move in the direction of heat-on after it has engaged the stop.

Consequently, in the operation of the device in controlling the temperature of an oven or other appliance if the adjusting knob 58 be turned in a counter-clockwise direction from the high position setting of Fig. 6 toward the low position setting of Fig. 7 beyond the temperature at which the bulb and bellows have been filled, for example the above temperature of 250° F., to withdraw the rod 29 from the stud 21, as shown in Fig. 2, then when the oven cools responsively to this adjustment to a temperature below 250° F., the closed end of the bellows will come to a stop against the closed end of the chamber 18 at 250° F. However, in view of the fact that the temperature setting of the control device has been adjusted below 250° F. the switch will be held in its open circuit position by the engagement of the bellows against the closed end of the chamber 18.

For example if the oven has been operating at 400° F. and the attendant moves the knob 58, say to the zero position, the oven temperature will naturally try to follow the low setting of the control device. But in view of the fact that the liquid 20 has been filled for a minimum operation of 250° F., at which temperature the bellows can no longer expand and as the setting is for a lower temperature the switch will be opened irrespective of what temperature the liquid 20 cools to after the bellows has been stopped by the chamber 18. This constitutes an open circuit position of the switch. And heat will be cut off from the heating device until the knob 58 is returned to a position above the 250° F. setting which operation will move the rod 29 inwardly of the stud 21 sufficiently to permit the switch to close.

Thus, the control device can function only to apply heat and hold a temperature that falls within the elevated temperature range. This range is materially above the room temperature range. Therefore, if the control device be set for a temperature below the minimum of the elevated range, heat cannot possibly be applied to the controlled device. Only when the control device is set for a high temperature within the elevated range will heat be turned on.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device for a heater operable through a relatively wide predetermined elevated temperature range materially above the room temperature range comprising a switch controlling the application of heat to the heater movable between heat-on and heat cut-off positions, a bellows, a bulb adapted to be placed in thermal relation with said heater connected in a closed liquid system with said bellows, a liquid in said system controlling the position of the bellows in accordance with the temperature of the bulb at said heater, an operable connection between said bellows and switch so that the switch is operated between its heat-on and heat-off positions in accordance with the operation of the bellows to hold a substantially constant temperature in said heater within said predetermined elevated temperature range, an adjustable member controlling said connection so that the switch is operated between its controlling positions to hold different selected temperatures within the high and low limits of said predetermined elevated temperature range, the temperature held depending on the adjustment of said member, a stop limiting movement of the bellows in its heat-on direction and said liquid placed in said liquid system at a temperature substantially equal to the low temperature limit of said range and with the bellows against said stop so that in the operation of the control device when the adjustable member is set for a temperature below said low temperature limit, said bellows is prevented by said stop from moving to a position where it can operate the switch to turn on the heat, whereby the heat is permanently cut off until said adjustable member is moved to a position corresponding to a temperature setting within said predetermined temperature range.

2. A temperature control device for a heater operable through a relatively wide predetermined elevated temperature range materially above the room temperature range comprising a heat controlling element movable to positions to turn on and cut off the heat, an expansible and contractable member, a bulb adapted to be placed in thermal relation with the heater connected with said expansible and contractable member into a closed liquid system, a liquid filling said system operating to control the expansion and contraction of said member responsively to temperature changes at said bulb, connecting means between said expansible and contractable member and said controlling element moving the latter to its positions to cut off and reapply the heat responsively to temperature changes at said bulb to hold a substantially constant temperature in said heater within said predetermined elevated temperature range, adjustable means constructed and arranged to control the temperature setting of said controlling element settable to predetermined temperature positions so that said expansible and contractable member operates at different temperatures in said heater to cut off and reapply the heat to hold substantially constant selected temperatures within the high and low limits of said predetermined elevated temperature range, the temperature held depending upon the setting of said adjustable means, the latter means being adjustable to temperature settings below the low limit of said elevated range, and a stop in the path of said bellows to prevent movement thereof to a position to operate the controlling element to turn on the heat to establish the low temperature corresponding to the setting of said adjustable means when set below said low limit, whereby heat is permanently cut off until said adjustable member is returned to a position corresponding to a temperature within said elevated range.

3. A temperature control device for electric ovens and the like comprising a controlling switch for said oven, a chamber, a bellows having a liquid-tight engagement at one end with the mouth of said chamber and a closing wall at its other end, a bulb adapted to be placed in thermal relation with said oven, a tube connecting said bulb with said chamber, an expansible and contractable liquid filling said tube, bulb and the space within said chamber about said bellows so that when the temperature at the bulb increases the bellows is contracted in said chamber and when it reduces said bellows expands, the liquid being filled at an elevated temperature, that is substantially the minimum temperature of operation of said oven and while said bellows is against said closing wall, a rod within said bellows connected to the inner wall of its closed end and projecting from its mouth, means connecting said rod with said switch including a second rod threaded in said first and the second rod connected to the switch so that when said bellows contracts the switch is operated to open and thereby shut off the heat and when it expands said switch is closed to reapply the heat, and means for adjusting the position of said second rod with reference to said first so as to vary the temperature setting of said control device.

WALLACE J. ETTINGER.